United States Patent [19]

Bander et al.

[11] Patent Number: 4,471,081

[45] Date of Patent: Sep. 11, 1984

[54] CONTINUOUS LOW MOISTURE CATALYTIC METHOD FOR POLYMERIZATION OF CAPROLACTAM

[75] Inventors: John A. Bander, Richmond; Timothy S. Brown, Chesterfield; Leroy Chi-Tsun Lin; Donna M. Vultaggio, both of Richmond, all of Va.

[73] Assignee: Allied Corporation, Morris Township, Morris County, N.J.

[21] Appl. No.: 499,079

[22] Filed: May 27, 1983

[51] Int. Cl.$^3$ ............................................. C08G 69/16
[52] U.S. Cl. .................................. 523/313; 524/413; 524/606; 524/608; 528/319; 528/323
[58] Field of Search ...................... 528/313, 319, 323; 524/413, 606, 608

[56] References Cited

U.S. PATENT DOCUMENTS

| | | | |
|---|---|---|---|
| 2,735,839 | 2/1956 | Schrenk | 528/313 |
| 3,558,567 | 1/1971 | Twilley et al. | 528/313 |
| 3,741,939 | 6/1973 | Wittmer et al. | 528/313 |

*Primary Examiner*—Harold D. Anderson
*Attorney, Agent, or Firm*—Richard A. Anderson

[57] ABSTRACT

This invention is an improvement to the continuous method to polymerize caprolactam at temperatures over 220° but below 280° C. in the presence of free water, a catalyst capable of generating phosphoric acid at the reaction conditions, in the hydrolyzer to form a prepolymer, with subsequent stripping of water and other low boiling compounds, and with completion of polymerization in a final finisher under a vacuum. The improvement comprises limiting the amount of free water fed to the polymerization process to less than about 1.5 percent but above 0.5 percent by weight of polymer and limiting the amount of catalyst being fed to the polymerization process to between about 5 ppm and 100 ppm of polymer of measured phosphorus so that (a) the rate of the process increases at the same temperature and pressure, or dimer content of the final polymer decreases or both, (b) the molecular weight of prepolymer from the hydrolyzer of the process increases, (c) less water is removed from the polymer and prepolymer during processing, (d) conditions required to remove water and other low boiling compounds from the finisher are less severe, resulting in a lower temperature of the polymer delivered to spinning from the final finish or a lower cost for vacuum removal or both, and (e) there is a reduction of deposits on the screen for molten final polymer prior to spinning.

9 Claims, No Drawings

CONTINUOUS LOW MOISTURE CATALYTIC METHOD FOR POLYMERIZATION OF CAPROLACTAM

BACKGROUND OF THE INVENTION

This invention relates to the production of polyamides, particularly the production of poly(epsilon-caprolactam), known as nylon 6, shaped articles such as filaments produced directly from freshly prepared (nascent) polymer. More particularly, the invention relates to an improvement in the first or hydrolysis step of polymerization, namely, limiting the amount of free water fed to the polymerization process and limiting catalyst being fed to the polymerization process to a specific range.

The apparatus preferred for the practice of the process of this invention is that shown in FIG. 3 of U.S. Pat. No. 4,310,659 or alternatively, using the hydrolyzer shown in the figure of U.S. Pat. No. 3,813,366 to replace the two-stage hydrolyzer labeled 1 and 2 in FIG. 3 of U.S. Pat. No. 4,310,659. The above patents, particularly the drawings of each, are hereby incorporated by reference.

Previous nascent, or polymerization directly coupled to spinning, processes such as that described in U.S. Pat. No. 3,813,366 and in U.S. Pat. No. 3,578,640, also hereby incorporated by reference, produced shaped articles such as filaments (fiber) having higher water extractables content than the similar articles (fiber) produced from polymer chips which were water washed and dried before being melted and shaped as by spinning. Such a batch process is disclosed in U.S. Pat. No. 3,242,134, hereby incorporated by reference, which also discloses the use of manganous chloride and hypophosphorus acid dissolved in caprolactam to improve light stability of the resulting nylon filaments. A particularly troublesome water extractable component to processes of shaped articles (fiber) are cyclic oligomers of caprolactam. Present directly coupled (nascent) processes produced fiber or other shaped articles having a cyclic dimer content of about 0.15 to 0.3 percent compared to fiber or shaped articles produced from washed, dried and melted chips of about 0.1 percent cyclic dimer content. See the discussion at column 1 of U.S. Pat. No. 4,310,659 and also U.S. Pat. No. 3,287,322, hereby incorporated by reference, for discussion of oligomers and their effects in yarn.

The definition of "water extractables", "oligomer", and "polymer" is found in U.S. Pat. No. 4,310,659 which is hereby incorporated by reference. Total oligomer content is difficult to measure. However, cyclic dimer content can be routinely measured. Thus, the cyclic dimer content discussed herein provides a rough indication of the total oligomer content of the polymer. It is commercially known to practice the invention described in U.S. Pat. No. 4,310,659 or U.S. Pat. No. 4,813,366, details of the final finisher used are disclosed in U.S. Pat. Re. No. 28,937, hereby incorporated by reference, using manganous hypophosphite as an additive to the hydrolyzer with a water content as low as 1.5 percent. It is also commercially known to practice the method disclosed in U.S. Pat. No. 3,242,134 with lower water content, see, for example, Example 2. Also, U.S. Pat. No. 3,425,986 discloses the use of metal pyrophosphate with water content as low as 0.1 to 1.5 percent. The above listed prior art is hereby incorporated by reference as is the following less pertinent prior art:

U.S. Pat. No. 3,779,998 discloses hypophosphorus acid as a catalyst but discloses a reduced viscosity of the resulting polymer. U.S. Pat. No. 3,579,483 discloses use of hypophosphorus acid and manganese chloride but does not teach the water content of the feed polymer. U.S. Pat. No. 2,564,001 discloses a much higher percent of hypophosphorus acid as catalyst. U.S. Pat. No. 3,173,898 discloses the manganese salt and U.S. Pat. No. 2,640,044 and U.S. Pat. No. 2,705,227 teach the use of the hypophosphorus acid catalyst but require other additives or make no teaching of the water content. Also of interest are U.S. Pat. No. 3,352,821; U.S. Pat. No. 4,111,869, which requires an anhydrous system; U.S. Pat. Nos. 3,211,705; 3,328,342; 3,330,802; 2,887,462; 2,564,001; 3,594,346; 3,640,948; 4,097,469; 3,002,947; 3,893,973; 3,839,380; 2,557,808; G.B. Pat. Nos. 1,193,866 and 663,761.

The following literature teaches use of low free water content polymerization of nylon at different or no catalytic phosphorus levels.

Water content between 0.76 and 2.12% with no other catalyst is taught in sealed tube studies by Kazuo Tai et al. in *J. of Appl. Polymer, Science*, Vol. 24, pages 211–224 (1979), John Wiley.

D. Heikens et al. teach water content between 0.8 and 1% with no catalyst in *J. Polymer Sci.*, Vol. XLIV, pages 437–448 (1960).

In *Khimicheskie Volokna*, No. 1, pages 29–31 (1977), Khaitin et al. teach 0.9 to 3.6% water with no catalyst.

Furukawa et al. in *Kobanshi Ronbanshu*, Vol. 37, No. 8, pages 535–541 teach a series of phosphorus compounds, including phosphoric, at 310 ppm with 0.2% water in sealed tube studies.

Mizerovski et al. teach in *Khimicheskie Volokna*, No. 3, page 69 (1973) 1400 ppm of $H_3PO_4$ with 0.5% water in sealed tube studies.

SUMMARY OF THE INVENTION

This invention is an improvement in a continuous method to polymerize epsilon-caprolactam at temperatures of over about 200° C. but below about 280° C. in the presence of free water, and a nonmetallic catalyst capable of generating phosphoric acid ($H_3PO_4$) at the reaction conditions in a hydrolyzer to form prepolymer with subsequent vacuum stripping of water and other low boiling compounds and with completion of polymerization in a final finisher under vacuum. The improvement comprises:

limiting the amount of free water fed to the polymerization process to less than about 1.5% but above 0.5% by weight of polymer;

limiting the amount of catalyst being fed to the polymerization process to between about 5 ppm and about 100 ppm of polymer of measured phosphorus; and increasing the hydrolyzer temperature from 0° to about 10° C. so that (a) the rate of the process increases or dimer content of the final polymer decreases or both;

(b) the molecular weight of the prepolymer from the hydrolyzer of the process increases, (c) less water is removed from the polymer and prepolymer during processing, and (d) conditions required to remove water and other low boiling compounds from the finisher are less severe, resulting in a lower temperature of the polymer delivered to spinning from the final finisher or a lower cost for vacuum removal or both.

By nonmetallic catalyst is meant no metal is present, including metal cations in a salt. Thus, the metallic salts are not part of this invention.

It is preferred to add a stabilizer in the form of $MnCl_2.4H_2O$ in an amount from between about 5 ppm to about 40 ppm of polymer of measured Mn. Preferably, the catalyst is selected from the group consisting of hypophosphorus acid, phosphoric acid, phosphoric acid, phosphoric acid esters, phosphonic acid esters, and hypophosphorous acid esters. Preferably, the hydrolyzer operates at a temperature of from between about 210° C. and about 270° C., a pressure of from about 35 to about 130 psig (340 kPa to about 1000 kPa) in a multistage operation. The preferred hydrolyzer has between about 1 to 12 stages, and the temperature of the first stage is between about 200° C. and about 250° C. and increases about 1° to about 10° at each stage to a final stage at about 270° C. The final finisher of the apparatus of this process operates at a temperature of from about 240° C. to about 260° C. and a pressure of from about 10 mm Hg to about 90 mm Hg (1.3 kPa to 117 kPa). The polymer exiting the final finisher in the apparatus of this invention is at a temperature of from between about 240° C. and 260° C. The nylon 6 product prepared by this method is also part of this invention. The preferred catalysts are $H_3PO_2$ and $H_3PO_4$.

The preferred phosphorus compounds have the following chemical structures:

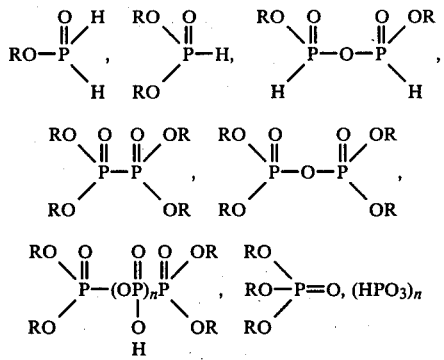

where R is H or any monovalent organic radical, and n is an integer from 2 to 5.

DESCRIPTION OF THE PREFERRED EMBODIMENTS

The method of this invention is preferably carried out in the apparatus shown in FIG. 3 of U.S. Pat. No. 4,310,659 with the apparatus of the figure of U.S. Pat. No. 3,813,366 used in place of the two-stage hydrolysis vessels labeled 1 and 2 in FIG. 3 of U.S. Pat. No. 4,310,659. Operation of finisher 10 in FIG. 3 of U.S. Pat. No. 4,310,659, is described in general in U.S. Pat. Re. No. 28,937. Finisher operating conditions are less stringent due to the method of this invention as will be shown below.

Using the apparatus described above, trials were run on a commercial scale. During this trial hydrolyzer water content was reduced from 1.65 to 1.10%, while stage temperatures in the hydrolyzer increased 6° C. With each reduction in water, hydrolyzer prepolymer increased in molecular weight. Cyclic dimer content was unchanged.

Due to the increased molecular weight of the prepolymer, adjustments in finisher operation were necessary for process control. These included reduced inventory, reduced rotor speed and decreased polymer temperature. Two benefits were realized by decreasing the finisher polymer temperature; (1) a decreased polymer temperature supplied to spinning (about 6° C.) which improves EPT control and (2) reduced susceptability to high extractables during rate upsets. EPT is exit polymer temperature and is important to control as well as possible to provide good spinning conditions for high quality yarn free of defects.

Trial results confirmed that the combination catalyst system, coupled with reduced hydrolyzer water and increased stage temperatures, will allow a substantial increase in hydrolyzer and finisher capacities. A capacity increase of up to 37% appears feasible. The combination catalyst (of this invention) system is 22 ppm Mn from $MnCl_2.4H_2O$ and 24 ppm P from $H_3PO_2$.

Capacity increases on all melt trains are feasible and provide an opportunity for staged, cost-effective expansions. Quality improvements will also be realized. These include improved process stability and reduced temperature of polymer delivered to spinning.

DISCUSSION

Trial Design

Process Simulations

The NPPS (nylon polymerization process simulator) computer model, with the above combination as catalyst, was used to simulate the commercial continuous hydrolyzer. This model is based on kinetic information from sealed tube and pilot plant experiments, and prior "continuous" train (using kettles as in U.S. Pat. No. 3,578,640) operations. Recent data was used to determine pretrial conversion and cyclic dimer levels. These levels were used as the basis for setting trial process conditions. Simulations were run for various train rates, with two differently terminated polymers. As water content decreased, stage temperatures were increased to maintain the pretrial conversion level. Cyclic dimer content remained approximately the same. As an example of these simulations, Table 1 below compares predicted hydrolyzer stage temperatures and molecular weight with water concentration for polymer labeled 2 below at 7200 pph (3272.7 kg/hr) polymer to spinning. The average stage temperature was predicted to increase 7° C., while $H_{20}$ content decreased from 1.65% to 1.1%. Prepolymer molecular weight was predicted to increase from 5900 to 6820.

TABLE 1

| NPPS MODEL PREDICTIONS, HYDROLYZER TEMPERATURES VS. WATER CONCENTRATION | | | | | |
|---|---|---|---|---|---|
| Water, % | 1.65 | 1.50 | 1.40 | 1.25 | 1.10 |
| Hydrolyzer Stage Temperatures, °C. | | | | | |
| Stage 1 | 226 | 228 | 229 | 231 | 233 |
| Stage 2 | 232 | 234 | 235 | 237 | 239 |
| Stage 3 | 240 | 242 | 243 | 245 | 247 |
| Stage 4 | 246 | 248 | 249 | 251 | 253 |
| Stage 5 | 250 | 252 | 253 | 255 | 257 |
| Stage 6 | 256 | 258 | 259 | 261 | 263 |
| Stage 7 | 258 | 260 | 261 | 263 | 265 |
| Stage 8 | 260 | 262 | 263 | 265 | 267 |
| Average Temperature, °C. | 246 | 248 | 249 | 251 | 253 |
| RESULTS: | | | | | |
| Lactam, % | 11.8 | 11.7 | 11.8 | 11.8 | 11.8 |
| Cyclic Dimer, %, as is | 0.246 | 0.249 | 0.245 | 0.244 | 0.239 |
| COOH, Lactam- | 125 | 120 | 115 | 110 | 103 |

TABLE 1-continued

NPPS MODEL PREDICTIONS,
HYDROLYZER TEMPERATURES VS.
WATER CONCENTRATION

Free Basis
Molecular Weight    5 900   6 100   6 290   6 510   6 820
Basis:    7 200 pph (3 272.7 kg/hr) product
Product:  2 (below)

Trial Procedure

In order to ensure stable process control throughout the trial, water concentration was reduced from 1.65% in steps. Hydrolyzer stage temperatures were increased several hours before each water reduction occurred. This kept lactam conversion high and prevented operational upsets when the water level was decreased. Finisher adjustments were made as required to maintain specified product viscosity and extractables. Train operation was allowed to stabilize and was evaluated before further process changes were made.

The sample valve at the bottom of the hydrolyzer was used to sample the prepolymer during these trials. Samples were taken twice a day and analyzed for extractables, viscosity, carboxyl and amine end groups, and cyclic oligomers.

RESULTS

Both rate and polymer type varied during the trial. Seven different combinations of rate, water concentration and polymer type occurred, and data was analyzed for each. There were two rate changes: (1) from 7200 pounds per hour (pph) (3272.7 kg/hr) to 6000 pph (2727.3 kg/hr) and (2) from 6000 pph (2727.3 kg/hr) to 5400 pph (2454.5 kg/hr). A product switch from Type 1 to Type 2 also occurred. Under all combinations, train operation was stable. Lactam conversion and cyclic dimer levels remained approximately at pretrial levels.

Table 2 contains the NPPS computer model predictions of hydrolyzer sample analysis for each combination. Table 3 contains trial results for these combinations, based on actual sample analysis.

Hydrolyzer Molecular Weight Increase

Comparisons between model predictions and trial results are shown below:

| % Water | Product | Rate | Molecular Weight Model | Actual | ΔMW |
|---|---|---|---|---|---|
| 1.65 | 1 | 7 200 pph (3 272.7 kg/hr) | 5 710 | 5 680 | 30 |
| 1.50 | 1 | 7 200 pph (3 272.7 kg/hr) | 5 920 | 5 810 | 110 |
| 1.40 | 1 | 7 200 pph (3 272.7 kg/hr) | 6 060 | 6 130 | 70 |
| 1.40 | 2 | 7 200 pph (3 272.7 kg/hr) | 6 250 | 6 210 | 40 |
| 1.25 | 2 | 6 000 pph (2 727.3 kg/hr) | 6 670 | 6 760 | 90 |
| 1.25 | 2 | 5 400 pph (2 454.5 kg/hr) | 6 760 | 6 850 | 90 |
| 1.10 | 2 | 6 000 pph (2 727.3 kg/hr) | 6 940 | 6 990 | 50 |

Product 1 - A medium dyeable bright polymer terminated with acetic acid and cyclohexylamine to have about 20 carboxyl and 27 amine ends.
Product 2 - A deep dyeable bright polymer terminated with cyclohexylamine to have about 10 carboxyl and 54 amine ends.

In all cases there was a very good correlation between model prediction and actual result. The worst correlation, with 1.5% water, probably occurred because the trial lasted only one day, and the system had not come to equilibrium. The model appears to be as accurate at low water concentrations as at the higher levels. Results showed a substantial increase in prepolymer molecular weight (about 23%) from the initial 1.65% water to the final 1.1%. Demonstrating this predicted increase was one of the main objectives of the trial.

TABLE 2

NPPS COMPUTER MODEL PREDICTIONS FOR TRIAL CONDITIONS

| Hydrolyzer Conditions: | Comparative 1 | Comparative 2 | 3 | 4 | 5 | 6 | 7 |
|---|---|---|---|---|---|---|---|
| Product Rate: | | | | | | | |
| pph | 7 200 | 7 200 | 7 200 | 7 200 | 6 000 | 6 000 | 5 400 |
| (kg/hr) | (3 272.7) | (3 272.7) | (3 272.7) | (3 272.7) | (2 727.3) | (2 727.3) | (2 454.5) |
| % Water | 1.65 | 1.50 | 1.40 | 1.40 | 1.25 | 1.10 | 1.25 |
| Polymer Type | 1 | 1 | 1 | 2 | 2 | 2 | 2 |
| Average Hydrolyzer Temperature, °C. | 242 | 245 | 247 | 247 | 246 | 248 | 244 |
| Predicted Hydrolyzer Sample Analysis: | | | | | | | |
| Lactam, % | 11.6 | 11.1 | 10.7 | 12.0 | 11.3 | 11.6 | 11.1 |
| Cyclic Dimer, % as is | 0.236 | 0.259 | 0.271 | 0.226 | 0.227 | 0.218 | 0.231 |
| COOH (Lactam-Free Basis) | 141 | 135 | 131 | 116 | 106 | 100 | 104 |
| NH$_2$ (Lactam-Free Basis) | 148 | 142 | 138 | 160 | 150 | 144 | 148 |
| Molecular Weight | 5 710 | 5 920 | 6 060 | 6250 | 6670 | 6940 | 6760 |

TABLE 3

TRIAL RESULTS

| Hydrolyzer Conditions: | Comparative 1 | Comparative 2 | 3 | 4 | 5 | 6 | 7 |
|---|---|---|---|---|---|---|---|
| Product Rate: | | | | | | | |
| pph | 7 200 | 7 200 | 7 200 | 7 200 | 6 000 | 6 000 | 5 400 |
| (kg/hr) | (3 272.7) | (3 272.7) | (3 272.7) | (3 272.7) | (2 727.3) | (2 727.3) | (2 454.5) |
| % Water | 1.65 | 1.50 | 1.40 | 1.40 | 1.25 | 1.10 | 1.25 |
| Polymer Type | 1 | 1 | 1 | 2 | 2 | 2 | 2 |
| Average Hydrolyzer | 242 | 245 | 247 | 247 | 246 | 248 | 244 |

TABLE 3-continued
TRIAL RESULTS

| Hydrolyzer Conditions: | Comparative 1 | Comparative 2 | 3 | 4 | 5 | 6 | 7 |
|---|---|---|---|---|---|---|---|
| Temperature, °C. | | | | | | | |
| Finisher Conditions: | | | | | | | |
| Exit Level, % | 84 | 81 | 81 | 75 | 90 | 90 | 79 |
| Rotor Speed, rpm | 6.3 | 5.5 | 5.5 | 5.5 | 4.5 | 4.0 | 4.0 |
| Exit Polymer Temperature, °C. | 252 | 248 | 246 | 246 | 244 | 241 | 240 |
| S.T. Line Polymer Temperature, °C. | 264 | 260 | 258 | 258 | 256 | 253 | 252 |
| Hydrolyzer Sample Analysis: | | | | | | | |
| Lactam, % | 11.4 | 11.2 | 11.1 | 11.7 | 11.0 | 11.8 | 11.1 |
| Cyclic Dimer, As Is, % | 0.212 | 0.228 | 0.202 | 0.173 | 0.166 | 0.191 | 0.184 |
| COOH (Lactam-Free Basis) | 142 | 138 | 129 | 117 | 104 | 99 | 102 |
| NH$_2$ (Lactam-Free Basis) | 155 | 149 | 142 | 166 | 154 | 152 | 153 |
| Molecular Weight | 5 680 | 5 810 | 6 130 | 6 210 | 6 760 | 6 990 | 6 850 |

Finisher Operating Conditions

As a result of the increase in prepolymer molecular weight, finisher conditions were modified to maintain process control. These adjustments included a decrease in exit level to reduce residence time, and a reduction in rotor speed and exiting polymer temperature to reduce polycondensation.

A comparison of finisher conditions for each case is shown in Table 3. These results demonstrated that increased prepolymer molecular weight required a moderation of finisher conditions to maintain product specifications. By increasing prepolymer molecular weight, the amount of polycondensation water to be removed in the finisher decreased. This decrease in polycondensation water per pound of polymer will allow finisher capacity to increase.

Polymer Temperature Exiting Finisher

Two benefits were realized from the reduction in polymer temperature exiting the finisher. First was a reduction in polymer temperature supplied to spinning of 6° C. at a rate of 7200 pph (3272.7 kg/hr). This will improve EPT control with current operations and diminish the threat of high EPT and resultant fusion with increased throughputs. During the trial, finisher conditions were not optimized to give the lowest polymer temperature, and maintain adequate polycondensation. If optimization occurs, it is probable that polymer temperature could be reduced further.

The second benefit of reduced finisher polymer temperature was a reduced susceptability to high extractables during rate upsets. Increased extractables control is due to the temperature dependency of the relationships between product of ends and water vapor pressure. As polymer temperature decreases, equilibrium water vapor pressure decreases. When a rate upset occurs, finisher pressure will not increase as much as at a higher polymer temperature, with its increased equilibrium pressure. With a lower finisher pressure, extractables remain within specifications.

Capacity Potential

Trial results confirmed that the combination catalyst system coupled with reduced hydrolyzer water and elevated stage temperatures, increased prepolymer molecular weight. Surprisingly, cyclic dimer content did not increase. Increasing the molecular weight decreases the amount of polycondensation required to convert prepolymer to product specifications. This allows a substantial increase in finisher capacity, since capacity is determined by polycondensation requirements. Prepolymer molecular weight is determined by initial hydrolyzer water content. By decreasing the water, prepolymer molecular weight increases, thereby increasing potential finisher capacity.

With the present additives system, the minimum achievable water content is 1.0%. Modifying the additives system would allow further water reductions and finisher capacity increases. For example, the water content was reduced to 1.1% during the trial. The observed increase in prepolymer molecular weight translates to a potential 37% capacity increase.

By decreasing the initial water to 0.9%, the potential finisher capacity increase is predicted to be 43%. The potential capacity increase is 55%, with a reduction to 0.8% initial water. Computer simulations predict that hydrolyzer stage temperatures could be modified to support any of these train rates, while maintaining adequate lactam conversion and cyclic dimer levels.

The potential capacity increases described above are based on hydrolyzer and finisher operation only. Realization of these capacity increases requires identification and elimination of other choke points. These could include the lactam supply system, vacuum system, extruders, spinning machines, and utilities. Benefits realized from this trial are directly applicable to other trains also. Capacity increases on all melt trains are feasible and provide an opportunity for staged, cost-effective expansions.

After the trial, the apparatus of the commercial train described above continued to use the combination catalyst system operating under the operating conditions given above and in the prior art and according to these key conditions (others are standard and available in the art):

Feed: 8780 lb/hr (3990 kg/hr) total, including 1.4% (wt) free water; 200° C.

Hydrolyzer: Residence Time 4.1 hrs. Temperature—244° C.

The method gives 88% conversion of caprolactam to nylon 6. The molecular weight of the prepolymer exiting the hydrolyzer was about 6200. The cyclic dimer content was surprisingly only 0.27% by weight and cyclic trimer content was 0.47% by weight of the polymer in the polymer from the final finisher, measured by free fall sample from spinning. The prior art using manganous hypophosphite and 1.6% water at comparable operating conditions, but much lower rate, 6600 lb/hr (3000 kg/hr), gave 0.3% by weight cyclic dimer and 0.54% by weight cyclic trimer content in the spinning polymer.

Optimum Conditions

The proposed optimum operating conditions in the same apparatus for the combination catalyst system are as follows:

Feed: 12,000 lb/hr (5400 kg/hr) total, including 1% (wt) free water; 200° C.

Hydrolyzer: Residence Time 3.2 hours. Temperature—257° C.

Results: 88% conversion of caprolactam for nylon 6. Molecular weight of prepolymer 7000.

Competitive model runs show that, in comparison using manganous hypophosphite (MHP), conversion is lower, prepolymer molecular weight is lower and conditions are predicted to be too unstable to operate commercially. For example:

Feed: 12,000 lb/hr (5454 kg/hr) including 1% (weight) free water; 210° C. 11 ppm Mn and 12 ppm P from $Mn(H_2PO_2)_2 \cdot H_2O$.

Hydrolyzer: Residence Time 3.2 hours. Temperature 257° C.

Results: 85% conversion lactam to nylon 6. Molecular weight of prepolymer 6500.

This low degree of conversion would overwhelm the downstream processing vacuum equipment.

By lowering the rate to 9000 lb/hr (4090.9 kg/hr) MHP, 1% water process would have:

Hydrolyzer: Residence Time 4.4 hours. Temperature 257° C.

to get 88% conversion and prepolymer molecular weight 7000, but the cyclic dimer content would be over the commercial specification.

Previous best prior art operating conditions using MHP (11 ppm Mn and 12 ppm P) are:

I

Feed: 5775 lb/hr (2625 kg/hr) including 1.5% water; 210° C.

Hydrolyzer: Residence time 5.8 hrs. Temperature, 260° C.

Results: 88% Conversion lactam to nylon 6. Molecular weight, prepolymer 6450. Cyclic dimer content of polymer to spinning, 0.35% (weight).

II

Feed: 8780 lb/hr (3990 kg/hr) including 1.65% water 210° C.

Hydrolyzer: Residence time 4.1 hrs. Temperature, 241° C.

Results: 88% Conversion lactam to nylon 6. Molecular weight, prepolymer 5800. Cyclic dimer content of polymer to spinning, 0.24% (weight).

For the batch process disclosed in U.S. Pat. No. 3,242,134, it is known prior art to operate the first kettle at 60 psig (515 kPa), 280° C. and about 0.42% water added by steam figured from equilibrium calculations using the combination catalyst system 14 ppm Mn in $MnCl_2$ and 31 ppm P in $H_3PO_2$. This batch process has no vacuum stripping and all stages of all vessels are under pressures. Water and monomer are removed by nitrogen sweep of the vessels (kettles).

Downstream Conditions

Using the optimum conditions given above: feed 12,000 lb/hr (5454 kg/hr), 1.0% water, 3.2 hours residence time, 257° C., 88% conversion, molecular weight 7000; following would be key downstream operating conditions. Other conditions would be standard as known in the art.

Evaporator: 35 mm Hg; 260° C.

Finisher: 35 mm Hg; 250° C.

BENEFITS

Polymerization Rate

Substitution of the combination catalyst discussed above for MHP as catalyst in the commercial polymer trains will substantially increase the polymerization capability of these facilities by increasing the reaction rate. Essentially, the process changes are: a hydrolyzer water reduction and elevated stage temperatures. These changes result in a reduction in residence time necessary to arrive at a given conversion.

The improved catalytic activity of the catalyst of this invention under low water conditions results in increased molecular weight of the hydrolyzer product. Due to this increase, downstream molecular weight growth requirements have been reduced to give desired product molecular weight, and existing equipment will support an increased rate. It is projected that the trains can support rate increases of up to 37%. Surprisingly, cyclic dimer content does not increase.

Capacity projections are made on the basis of NPPS kinetic model simulations and confirmation of the hydrolyzer molecular weight growth, however, was obtained from a 30-day trial on a commercial polymer train. Additionally, excellent agreement was obtained between the kinetic model projections and actual trial data. Details of this trial and results are documented above.

OPERATION/QUALITY IMPROVEMENTS

Other surprising results, not associated with capacity improvements, are as follows:

(1) Reduction in side reactions: using the combination catalyst and operating conditions of this invention, an undesired side reaction, cyclic oligomer formation, was depressed. With identical conditions of temperature, residence time and hydrolyzer water content, a reduction of about 15% in cyclic oligomers is predicted by the NPPS model. This is based on actual reactions in the laboratory and trains and is not predictable otherwise. One would expect increased side reactions when increasing the primary reactions.

(2) When the molecular weight of finisher feed is increased due to low water operations of this invention, either throughput must be increased or finisher operation must be adjusted to maintain reactor pressure required for extractables control. These adjustments could include a polymer temperature reduction of up to 10° C., the actual temperature reduction observed during trials was 6° C. This polymer temperature reduction is beneficial for at least two reasons, described below.

First, the reduced polymer temperature improves process stability through reduced excursions in finisher pressure in response to variations in train rate. This result is due to the equilibrium relationship of product of ends (POE) versus water vapor pressure as a function of temperature (Fukomoto, *J. Polymer Science*, 22, 263, 1956). As polymer temperature is lowered, the equilibrium pressure decreases for a fixed product of ends.

Since the finisher operates at a pressure below equilibrium, the maximum pressure that the finisher will rise to, in response to residence time (throughput) changes, is depressed. Consequently, finisher operation is stabilized and pressure excursions are diminished.

Secondly, the reduced polymer temperature in the finisher lowers polymer temperature supplied to the spinning machine. This lessens cooling requirements to the spinning extruder, where polymer temperature reduction is inherently more difficult to achieve.

RELATIVE EFFECTIVENESS

The catalysts of this invention and other phosphorous oxyacid derivatives are not equally effective. The order of effectiveness of $P^{+1}$, $P^{+3}$ and $P^{+5}$ compounds is not absolutely clear. For example, there are conflicting reports on whether phosphoric or hypophosphorous acid is more effective. However, the preponderance of the evidence supports the following order:

$P^{+1}$ and $P^{+3}$ acids $H_3PO_4 >$ and ester, $p^{+5} > p^{+1}$ and $p^{+3}$ salts $>$ esters $p^{+5}$ salts, organically substituted $p^{+1}$ and $p^{+3}$ compounds.

Phosphoric acid is the most effective catalyst known for the hydrolytic polymerization of caprolactam. It is interesting that compounds in the second and third categories are quantitatively converted to phosphoric acid under the conditions of nylon polymerization while compounds in the least effective category are not converted to phosphoric acid to any appreciable extent. Effective phosphorus compounds are those that can be converted to phosphoric acid. This strongly suggests that phosphoric acid itself is the compound causing catalysis.

There are at least two factors that bear on catalytic effectiveness within a group of phosphorus compounds; acidity and phosphine-generating properties. As stated previously, acids are well-known nylon catalysts. At equal molar concentrations, a $P^{+3}$ (difunctional) might be more effective than a $P^{+1}$ (monofunctional) compound on the basis of hydrogen ion concentration. However, the strength of the acid is also a factor and the strength of $P^{+1}$ and $P^{+3}$ organic acids varies predictably with structure.

$P^{+1}$ and $P^{+3}$ compounds generate phosphines on decomposition. Some phosphines such as $PH_3$ are extremely effective catalysts while others such as $P(C_6H_5)_3$ have no catalytic properties at all. This difference may be due to the acid that would result on reaction with water. $PH_3$ would form phosphoric acid, $PH_2R$ would form a $P^{+3}$ acid, $PHR_2$ would form a $P^{+1}$ acid and $PR^3$ cannot form an acid.

We claim:

1. In a continuous method to polymerize by feeding caprolactam at temperatures over about 220° C. but below about 280° C. in contact with water, a nonmetallic catalyst capable of generating phosphoric acid ($H_3PO_4$) at the reaction conditions, to a hydrolyzer to form prepolymer with subsequent vacuum stripping of water and other low boiling compounds and with completion of polymerization in a final finisher under a vacuum, the improvement comprising
  limiting the amount of water fed to the polymerization process to less than about 1.5% but above about 0.5% by weight of epsilon-caprolactam, and
  limiting the amount of catalyst being fed to the polymerization process to between about 5 ppm and about 100 ppm of polymerized epsilon caprolactam of measured phosphorus, and
  increasing the temperature of the hydrolyzer 0° C. to about 10° C., above the temperature normally used for higher water content, so that
  (a) the rate of the process increased or cyclic dimer content of the final polymerized epsilon-caprolactam decreases or both,
  (b) the molecular weight of the polymerized epsilon-caprolactam from the hydrolyzer of the process increases,
  (c) less water is removed from the polymerized epsilon-caprolactam and prepolymer during processing, and
  (d) conditions required to remove water and other low boiling compounds from the finisher are less severe, resulting in a lower temperature of the polymerized epsilon-caprolactam delivered to spinning from the final finisher or a lower cost for vacuum removal of both.

2. The method of claim 1 wherein a polymer stabilizer in the form of $MnCl_2.4H_2O$ is added in an amount from between about 5 ppm to about 40 ppm of measured Mn, based on parts of polymerized epsilon-caprolactam.

3. The method of claim 1 wherein the catalyst is selected from the group consisting of hypophosphorus acid, phosphoric acid, phosphoric acid, phosphoric acid esters, phosphoric acid esters, and hypophosphorous acid esters; said catalyst having a structure selected from

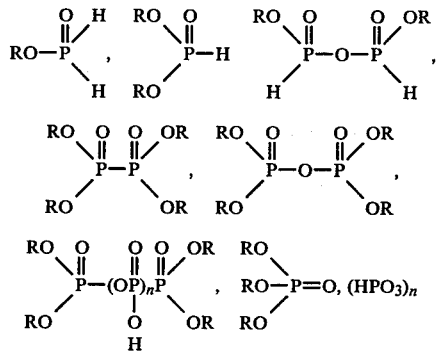

where R is H or any monovalent organic radical, and n is an integer from 2 to 5.

4. The method of claim 1 wherein said hydrolyzer operates at a temperature of from between 210° C. and about 270° C., a pressure of from about 35 to 130 psig in a multistage operation.

5. The method of claim 4 wherein the hydrolyzer has between about 1 to about 12 stages, and the temperature of the first stage is between about 200° C. and about 250° C. and increases about 1° to about 10° at each stage to a final stage at about 270° C.

6. The method of claim 1 wherein the final finisher operates at a temperature of from about 240° C. to about 260° C. and a pressure of from about 10 mm Hg to about 90 mm Hg.

7. The method of claim 6 wherein the polymerized epsilon-caprolactam exiting the final finisher is at a temperature of from between about 240° C. and about 260° C.

8. The method of claim 1 where the catalyst is $H_3PO_2$.

9. The method of claim 1 wherein the catalyst is $H_3PO_4$.

* * * * *

UNITED STATES PATENT AND TRADEMARK OFFICE
CERTIFICATE OF CORRECTION

PATENT NO. : 4,471,081
DATED : September 11, 1984
INVENTOR(S) : John A. Bander et al.

It is certified that error appears in the above-identified patent and that said Letters Patent are hereby corrected as shown below:

Column 12, line 26, second and third occurrence of "phosphoric" should read --phosphonic--

Signed and Sealed this

Nineteenth Day of February 1985

[SEAL]

Attest:

DONALD J. QUIGG

Attesting Officer

Acting Commissioner of Patents and Trademarks